US009121726B2

(12) United States Patent
Comen (10) Patent No.: US 9,121,726 B2
(45) Date of Patent: Sep. 1, 2015

(54) ENVIRONMENTAL FEEDBACK AND REMEDIATION SYSTEM (71) Applicant: Artisan Solutions, LLC, Anderson, SC (US)

(72) Inventor: David Comen, Anderson, SC (US)

(73) Assignee: Artisan Solutions, LLC, Anderson, SC (US)

( * ) Notice: Subject to any disclaimer, the term of this patent is extended or adjusted under 35 U.S.C. 154(b) by 380 days.

(21) Appl. No.: 13/658,549

(22) Filed: Oct. 23, 2012

(65) Prior Publication Data

US 2013/0285839 A1    Oct. 31, 2013

Related U.S. Application Data (60) Provisional application No. 61/551,848, filed on Oct. 26, 2011.

(51) Int. Cl.
*G08B 21/00* (2006.01)
*G01D 4/02* (2006.01)
*G06Q 10/06* (2012.01)

(52) U.S. Cl.
CPC . *G01D 4/02* (2013.01); *G06Q 10/06* (2013.01)

(58) Field of Classification Search
CPC .................................. G06Q 10/06; G01D 4/02
USPC .......... 340/853.1, 854.1, 854.3, 854.6, 854.8, 340/870.01, 870.16; 235/376
See application file for complete search history.

(56) References Cited

U.S. PATENT DOCUMENTS

| 6,356,205 | B1* | 3/2002 | Salvo et al. ................. 340/853.3 |
| 7,031,838 | B1* | 4/2006 | Young et al. ....................... 702/2 |
| 7,975,286 | B1* | 7/2011 | Fickey et al. ...................... 726/1 |
| 8,533,844 | B2* | 9/2013 | Mahaffey et al. ............... 726/25 |
| 8,639,474 | B2* | 1/2014 | Arefeen et al. ................ 702/183 |
| 2005/0027588 | A1* | 2/2005 | Current ........................... 705/11 |
| 2006/0235741 | A1* | 10/2006 | Deaton et al. ................... 705/10 |
| 2013/0082101 | A1* | 4/2013 | Omansky et al. ............. 235/376 |

* cited by examiner

*Primary Examiner* — Steven Lim
*Assistant Examiner* — Ryan Sherwin
(74) *Attorney, Agent, or Firm* — McNair Law Firm, P.A.; Douglas W. Kim (57) ABSTRACT A system for the remediation of non-compliant inspection items located at remote locations by infield operator comprising: server computer readable instructions stored on the server computer readable medium that, when executed by the processor, provides for: transmitting the inspection protocol to the remote computing device, receiving an inspection result from the remote computing device representing a measurement taken for one of the inspection items inspected by the infield representative, retrieving the compliance information associated with the inspection item from the database, comparing the compliance information with the inspection result to determine whether the inspection result is in compliance or non-compliant.

14 Claims, 9 Drawing Sheets

ENVIRONMENTAL FEEDBACK AND REMEDIATION SYSTEM

CLAIM OF PRIORITY

This application claims priority on U.S. Provisional Patent Application Ser. No. 61/551,848 was filed on Oct. 26, 2011.

FIELD OF THE INVENTION

This invention is directed to a system for minimizing inaccurate readings and untimely remediation actions when analyzing environmental apparatus and inspection items. More specifically, this invention is directed to a system that provides for remote (infield) readings to be processed and analyzed with real-time feedback to the infield operator allowing the infield operator to take further action if necessary while on location, thereby allowing the infield operator to more efficiently perform the infield operator's duties.

BACKGROUND OF THE INVENTION

To insure public safety, there are many laws and regulations governing our surface and ground water, food, and other aspects of modern life. For example, EPA published the Ground Water Rule in the Federal Register on Nov. 8, 2006. The purpose of the rule is to provide for increased protection against microbial pathogens in public water systems that use ground water sources. EPA is particularly concerned about ground water systems that are susceptible to fecal contamination since disease-causing pathogens may be found in fecal contamination. Under this rule, it is possible that ground water must be monitored so that one sample must be collected at each ground water source in use at the time the water system coliform-positive sample was collected. The triggered source water sample must be analyzed for the presence of a fecal indicator as specified in the rule.

Further, all samples taken should be recorded in an on-site sample log book or on a sample collection form if it is to be sent to a laboratory for analysis. Sample log books and sample collection forms should contain the following information: Name of system (e.g., Public Water System Identification number); Sample site location; Sample type (assessment, triggered); Sampler's name; Sample number; Date of sample collection; Time of sample collection and Analysis requested. Failure to follow these, and other requirements under the rules, can result in a penalty which can include fines up to $25,000, remediation plans and even up to $15,000 per day penalties for failure to follow EPA orders.

For other areas, regulations, instructions, procedures and requirements exist such as with the Resource Conservation and Recovery Act (RCRA) of 1976 governing solid and hazardous waste management. Penalties associated with failure to comply with the RCRA is based upon the penalty calculation system established through U.S. Environmental Protection Agency's RCRA Civil Penalty Policy (Section 3008 of RCRA, 42 U.S.C. § 6928). Under the RCRA, the seriousness of the violation and any good faith efforts to comply with applicable requirements are to be considered in assessing a penalty. Consistent with this statutory direction, this Penalty Policy consists of: (1) determining a gravity-based penalty for a particular violation from a penalty assessment matrix, (2) adding a "multi-day" component, as appropriate, to account for a violation's duration, (3) adjusting the sum of the gravity-based and multi-day components, up or down, for case specific circumstances, and (4) adding to this amount the appropriate economic benefit gained through non-compliance. Obviously, having a proper monitoring and inspection process to avoid penalties is desirable.

Similar risks are also associated with air pollution under the Clean Air Act (CAA). CAA is comprehensive federal law that regulates air emissions from stationary and mobile sources. The EPA works with its federal, state and tribal regulatory partners to assure compliance with clean air laws and regulations in order to protect human health and the environment. Failure to comply with these regulations can result in severe penalties with far reaching ramifications from fines to discouraging businesses to locate particular geographic regions. Again, having sufficient inspection and monitoring processes and systems in place will reduce the risks associated with violations of the CAA.

Operationally, when complying with these regulations and performing monitoring and inspections, there are many other items that should be inspected and corrected. For example, ground water is typically tested from wells. The wells are locked from unauthorized access for safety reasons. When the ground water is inspected, the lock on the well should also be inspected. Other items that can interfere with a proper inspection for ground water include the depth measurement is out of range, identification of the well is no longer legible, vegetation is growing over the pad, the pad is broken or damaged, the well casing is damaged or the scheduled reading of a well was missed or improperly taken.

Operational items that can be present for RCRA inspections can include improperly labeled waste containers, satellite containers can be full, secondary containment can be damaged, spill response materials and kits can be missing or damaged, accumulation time limits can be approaching, storage and transportation tanks can be damaged and lines and valves can be damaged. Air pollution testing and inspections can include readings that are out of the expected range, maintenance is required of air pollution control equipment and scheduled readings are missed.

In each of the cases of operational abnormalities, regulations may not be followed due to operational items and violations can be caused. Therefore, it would be advantageous to have a system which would account for the operational items, offer real time feedback concerning the operational items and allow for the onsite/infield remediation or solution to identified problems without having the infield operator to make return trips to the remote location.

Additionally, there are several regulatory inspections that are required to be preformed. These inspections have to be documents to comply with the appropriate regulation. The regulatory structure states which information should be collected and reported. In the event that a location owner or company wishes to increase the information that is inspected, a task that should be encouraged, several regulations require that this additional information be included in the regulatory required report. Therefore, the reporting entity is put in a position that to increase the number of inspection actions, the entity will increase its regulatory restrictions; obviously not a position that is advantageous. Therefore, there is a need for a system that allows for the collection of inspection results without increasing the regulatory burden placed upon the inspecting entity.

Several attempts have been made to automate testing and measurements, but none are directed to providing an infield operator with real-time feedback for remediation or error correcting based upon the actions taken, measured or observed by the infield operator while the infield operator is still at the testing locations. For example, U.S. Pat. No. 7,415,357 is directed to an Automated Oil Well Test Classification and discloses systems, methods, and software for statistical analysis and classification of oil well tests. Some embodiments include receiving a first set of oil well test results from one or more measurement devices of a well test separator, storing the first set of oil well test results in a database, and annotating one or more tests of the first set oil well test results. The annotated test results are then used to build one or more classification models to enable automated oil well test classification as new oil well tests are performed.

United States Patent Publication 2006/0235741 is directed to a system and method for monitoring and reporting. This reference uses a work order, defining a target to be inspected at a remote site and including an inspection plan for collecting target inspection information, is generated on a base-station system and transferred to a portable computing system. Inspection data are collected pursuant to the inspection plan on the portable computing system. Inspection data are transferred from the portable computing system to the base-station system for storage and the generation of related reports. This reference does not provide the infield operator with real-time feedback concerning the recorded information and does not present the infield operator with error correcting steps or remediation steps to take while the infield operator remains at the remote location.

Accordingly, it would be advantageous to have a system which allowed for environmental inspection information that is collected at a remote location infield to be transmitted to a central location for analysis with results determined and transmitted back to the remote location for the infield operator to use for performing remediation.

SUMMARY OF THE INVENTION

The objects of the invention are accomplished by providing a system for the remediation of non-compliant environmental impact items located at remote locations by infield operator comprising: a server having a server computer readable medium, a server processor, wherein said server is in electronic communications with a remote computing device; a database representing inspection items to be inspected by the infield operator, wherein each inspection item includes an inspection set, wherein each inspection set includes item information, inspection protocol, inspection frequency, remediation action, notification and compliance information, wherein the inspection items are taken from the group consisting of: groundwater set, stormwater set, baghouse set and large quantity container set; and, server computer readable instructions stored on the server computer readable medium that, when executed by the server processor, provides for: receiving item information representing the inspection item the infield representative wishes to inspect, retrieving the inspection protocol from the database, transmitting the protocol to the remote computer device representing the steps to be taken by the infield representative to inspect the inspection item, receiving inspection result from the remote computing device representing a measurement taken for one of the inspection items inspected by the infield representative wherein the inspection results include the date and time and the results that were collected, the physical location of the inspection item and an infield operator identification representing the infield operator conducting the inspection, retrieving the compliance information associated with the inspection item from said database, comparing the compliance information with the inspection result to determine whether the inspection results is in compliance or non-compliant, storing the inspection result in the server computer readable medium if the inspection result is in compliance, transmitting a repeat measurement request to the remote computing device if the inspection result is non-compliant requesting that the inspection be repeated, receiving a second inspection result, comparing the compliance information with the second inspection result to determine whether the second inspection result is in compliance or non-compliant, storing the second inspection result in the server computer readable medium is the compliance results is in compliance, transmitting the remediation action to the remote computer device according to the inspection protocol if the second inspection result is non-compliant thereby requesting the infield operator to perform the remediation action, receiving a remediation action status indicator from the remote computing device wherein the remediation action status indicator is taken from the group consisting of: remediation action not preformed, remediation action preformed, remediation action taken and non-compliance resolved and remediation action taken and non-compliance not resolved, transmitting a second repeat measurement request to the remote computing device if the remediation action status is remediation action taken and non-compliance resolved and receiving a third inspection results, comparing the compliance information with the third inspection result to determine whether the inspection result is in compliance or non-compliant and storing the third inspection result in the server computer readable medium if the third inspection result is in compliance.

The server computer readable instructions can include instructions for retrieving past inspection result from the server computer readable medium for the inspection item, determining the time period between the inspection result and the past inspection results and determining whether the inspection results is within the inspection frequency for the inspection item; retrieving the date of a most recent inspection result stored in the server computer readable medium, retrieving the current time from the server, determining the period of time between the current time and the most recent inspection result and determining if the period of time is within the inspection frequency; and transmitting a warning to the remote computing device if the period of time is outside the inspection frequency.

The groundwater set can include inspection actions taken from the group consisting of: well identification present and legible, lock present and operable, well is freely accessible, concrete pad is intact, protective casing cover is intact, well cap present and intact, inside of security casing is clear of debris and total organic carbon measuring point clearly marked. Well information can be included in the groundwater set representing the wells to be tested; and, the server computer readable instructions include instructions for determining if inspection results from each well in the groundwater set are received and transmitting a notification to the remote computing device representing the wells for which inspection results were not received and requesting the infield operator to inspect wells which do not have inspection results.

The stormwater set can include inspection actions taken from the group consisting of: drips or leaks from trucks and trailers, vehicle maintenance activities conducted outside designated areas, vehicle washwaters not directed to a sanitary sewer system, unidentified discharges of pollutants present, indications of additional control measures needed and non-storm water in the storm water detention basin.

The baghouse set can includes inspection actions taken from the group consisting of: recording differential pressure readings, visible emissions from stack and bag inlet temperature.

The large quantity container set can include inspection actions taken from the group consisting of: containers leaking, containers dented, containers corroded, adequate aisle space, container stacked appropriately, incompatible wastes are properly segregated, containers compatible with washes, containment system devoid of liquids, no waste in containment area, cracks not present in containment area, containers properly marked, accumulation date marked, containers stored proper period and containers closed.

The server computer readable instructions can include instructions for generating a notification when an inspection item is deemed non-compliant and transmitting the notification to a second individual to provide notification of a non-compliant inspection item; generating a work order when an inspection item is deemed non-compliant and transmitting the work order to a recipient designated to receive work orders for the inspection item; generating a compliance report and generating a regulatory compliance report.

In one embodiment, the invention is a system for providing real-time feedback to infield operators at remote locations of measured environmental information comprising: a portable computer device (PDA) having a display, input means, computer readable medium, transceiver, PDA processor and PDA computer readable instructions, the PDA computer readable instructions include instructions that, when executed by the PDA processor provide the functionality of receiving location information, receiving remote site information, receiving location specific measurements, transmitting the location, remote site and measurement information to a decision server, receiving action/remediation instructions from the decision server and displaying the action/remediation instructions to the infield operator through the display; a decision server in electronic communications with the portable computing device having a transceiver, a server processor, computer readable medium and server computer readable instructions that when executed by the server processer, provide the functionality of receiving location, remote site and measurements information from the PDA, determining the category of analysis to perform on the receiving information, analyzing the receiving information, determining whether an action/remediation instruction should generated and sending the action/remediation instruction to the PDA is the action/remediation instruction is generated; and a database included in a computer readable medium in communication with the decision server having a set of range data representing the acceptable ranges of particular measurements, the server computer readable instructions including instruction for comparing the measurement information received from the PDA with the range of acceptable values and generating an action/remediation instruction if the measurement is outside the range.

This invention seeks to offer a solution for the collection and management of information and data from dispersed locations of periodic events, such as inspections including the inspection associated with the environmental regulatory industries. This invention seeks to insure timely collection of data and information, verifying entries, and initiating follow up actions, especially when the infield operator at still at the the inspection site. The system reminds the user if an inspection deadline is imminent, provides real-time feedback to operators during inspections, and forwards critical information to the person responsible for the inspected media.

Information and data are entered through multiple possibilities, including smart phones, tablets, and computers. Where wireless access is available, the information and data are uploaded real-time with corresponding feedback to operators. Where wireless access is not available for the recording device, information and data are queued for future upload. Data and information verification, contacts, and information transmittals are adapted to customers' standards. Information and data are stored electronically for retrieval.

For agency-required inspections or customer preference, a hard copy can also be generated in a customer-requested format. This has the added advantage of allowing the collection of information that exceeds the regulatory requirements without having the information collected integrated into the regulatory report thereby to avoid unnecessarily increasing the reporting requirements for regulatory inspection.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Computer readable instructions, when executed by a computer processor, cause the computer to perform a series of steps to accomplish a specific task. This computer readable code is tied to a particular machine with specific purpose of executing the computer readable code for accomplishing tangible results. The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result, when executed by a computer and its processor. These steps require physical manipulations of physical quantities such as electrical or magnetic physical elements and are capable of being stored, transferred, combined, compared, or otherwise manipulated readable medium that is designed to perform a specific task or tasks. Actual computer or executable code or computer readable code may not be contained within one file or one storage medium, but may span several computers or storage mediums. The term "host" and "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by a set of computer readable instructions or code.

These computer readable instructions may also be stored in a computer readable medium that can direct a computer or other programmable data processing apparatus to function in a particular manner, such that the instructions stored in a computer readable medium produce an article of manufacture including instruction means that implement the functions specified in the flowchart block or blocks. Computer program instructions may also be loaded onto a computer or other programmable apparatus to produce a computer executed process such that the instructions are executed on the computer or other programmable apparatus provide steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations can be implemented by special purpose hardware based computer systems that perform the specified functions, or steps, or combinations of special purpose hardware or computer instructions.

The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

Figure 1:
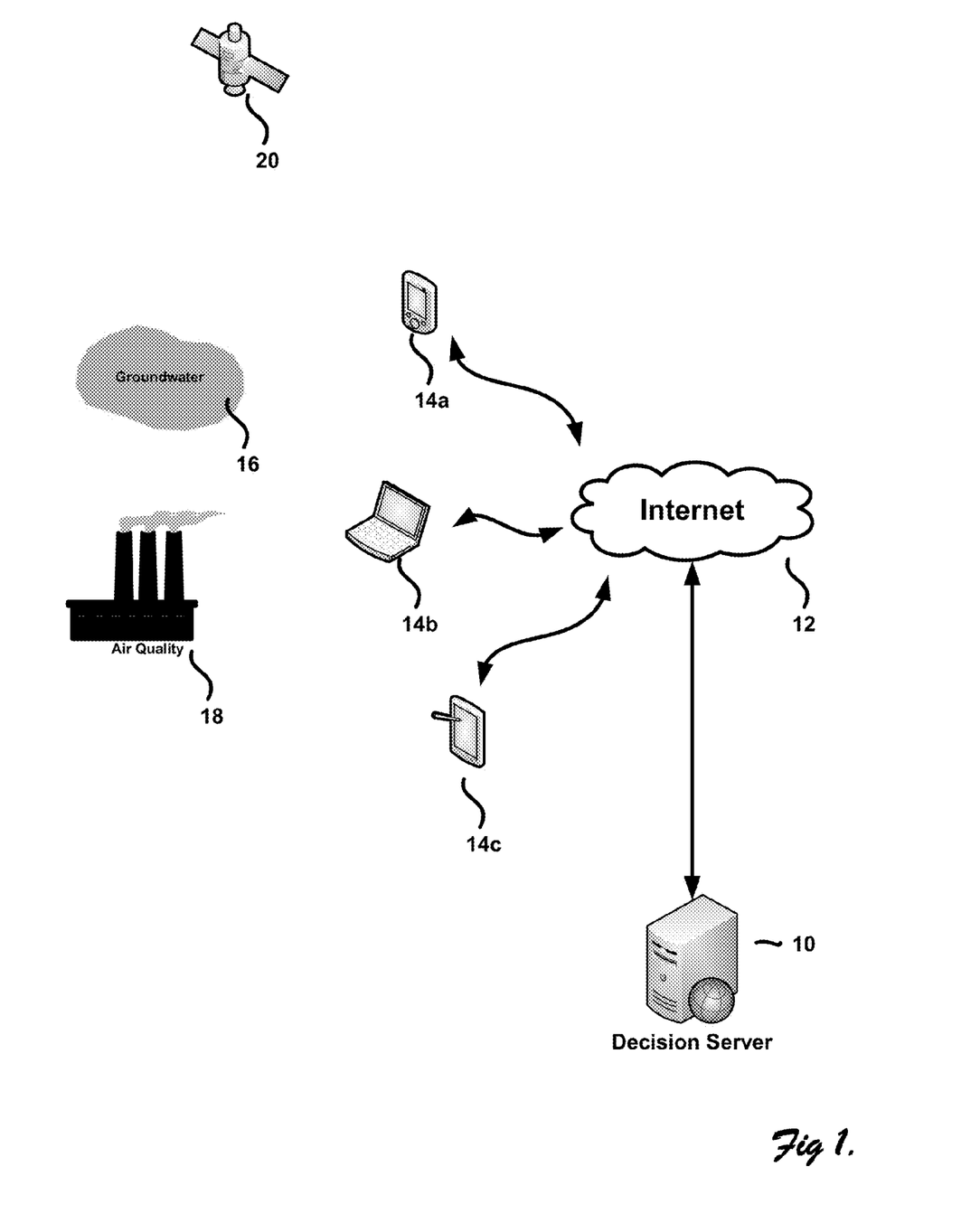
FIG. 1 is a schematic of the invention.

Referring to FIG. 1, a decision service 10 is connected to a global communications network 12 such as the Internet, cellular network, and the like. The decision server contains a computer readable medium having a plurality of databases and computer readable instructions for receiving and transmitting information to and from portable computing devices such as a PDA 14a, laptop computer 14b, pad computer 14d, smart phone or other portable computing device. The portable computing device is used to take reading, measurement or other information from visual observations, manual measurements or downloaded from sensor apparatus located as the remote location where information is to be gathered such as ground water wells 16 or air quality sampling areas such as 18. The operator computing device can also include a GPS receiver for receiving location information from GPS satellite 20.

Figure 2:
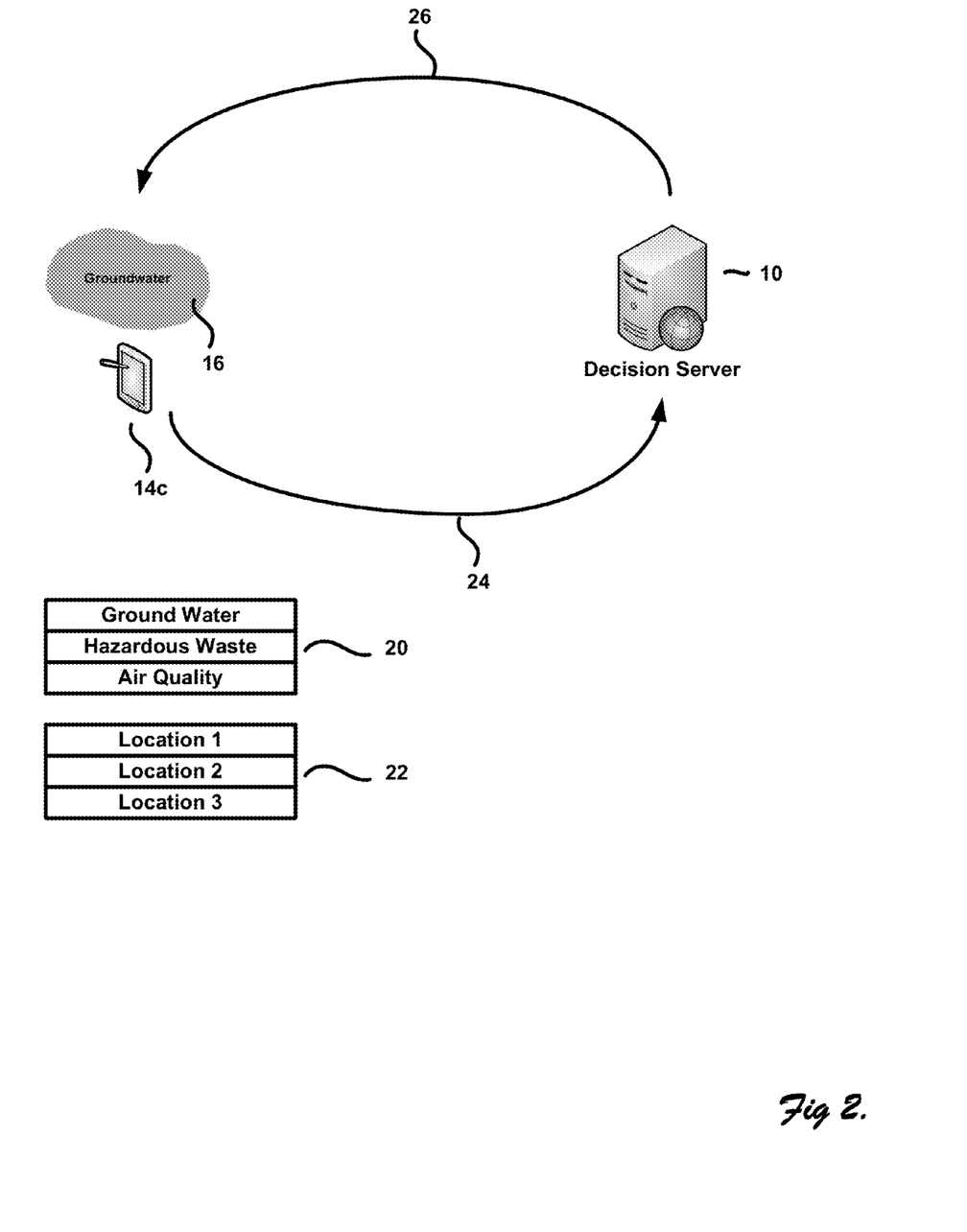
FIG. 2 is a schematic of the invention.

Referring to FIG. 2, the data information flow and operations aspects of the invention as described. In operation, the infield operator makes observations, takes measurements and otherwise inspects the data collection point such as a ground water source 16 using operator computer device 14c. When the infield operator initially arrives at the site, the operator computing device can contain computer readable instructions that allow the infield operator to select the type of inspection being performed such as ground water, hazardous waste or air quality as shown on input screen 22. The location where the testing is being performed can also be entered from a screen shown as 24. The operator computer device can record the inspection type, location (via GPS or other locations means such as cell network triangulation) and measurement information and transmit this information along communications path 24 to decision service 10. Based upon the receiving information from the location information and initial reading information, the decision server analysis this information and creates action items, if any. Action items can range from emergency repair or remediation items or informational items. For example, when measuring ground water, the recorded measurement sent to the decision server can be analyzed and one possible outcome would be to determine if the measured value is out of a normal range. If so, the decision server transmits an action request 26 to the portable computing device of the infield operator and requests that infield operator re-measure the water level. The infield operator can then retake the measurement and send it back to the decision server for analysis. If the water level is again out of range, the decision server can allow the measurement since it has been double-checked. This process eliminates the risk of the water level being improperly measured and having to send the infield operator back to the site when the information is downloaded while the infield operator is physically at the decision server. The infield operator is able to double-check the measurement while on site, saving much time and effort over the traditional methods.

By having such a feedback loop, the measurements are checked and if there are abnormalities, they are determined while the infield operator is still on site so that immediate action can be taken in response. Otherwise, the infield operator would have to return to the remote location and retake the measurement costing significant time and money.

Figure 3:
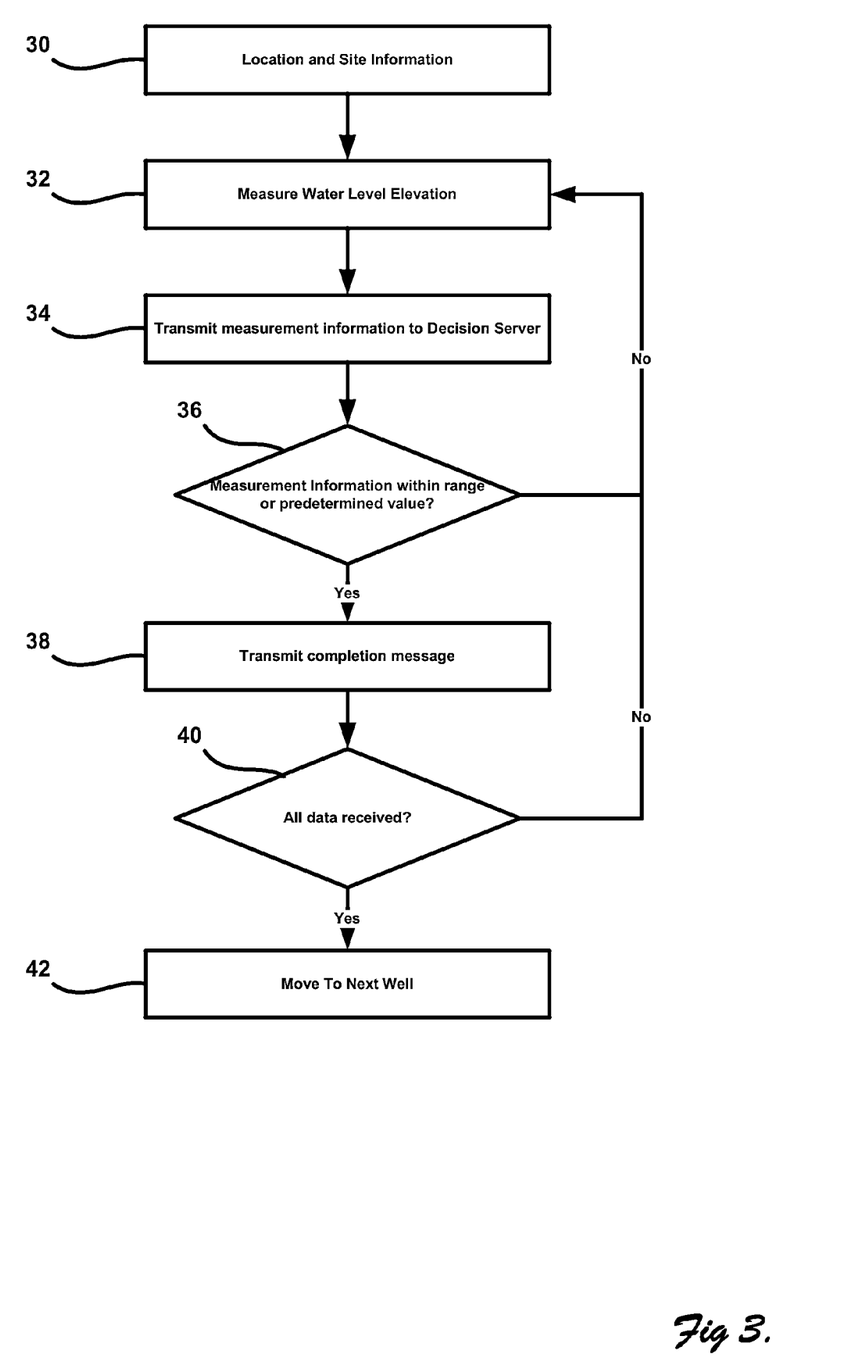
FIGS. 3 through 9 are flowcharts of the invention.

Referring to FIG. 3, a more detailed example of the functionality of the computer readable instructions is explained in more detail. For ground water, step 30 shows the recording of the location and site information by the portable computing device of the infield operator. The ground water elevation is measured at 32. The information is transmitted to the decision server at 34. A determination is made at 36 to see if the measured values are within a predetermined range. The predetermined range can be derived from several sources including past measurement values, values received from the owner or responsible party of the measurement location, industry values or statistics.

At step 38, the infield operator transmits a completion message to the decision server informing the decision server that the infield operator believes that all measurements have been taken. A determination is made at step 40 whether all the information that should be collected at the remote location has been received by the decision server. If not, the infield operator is transmitted a message to retake some or all of the measurements. Otherwise, the infield operator is informed to move to the next location at step 42.

Figure 4:
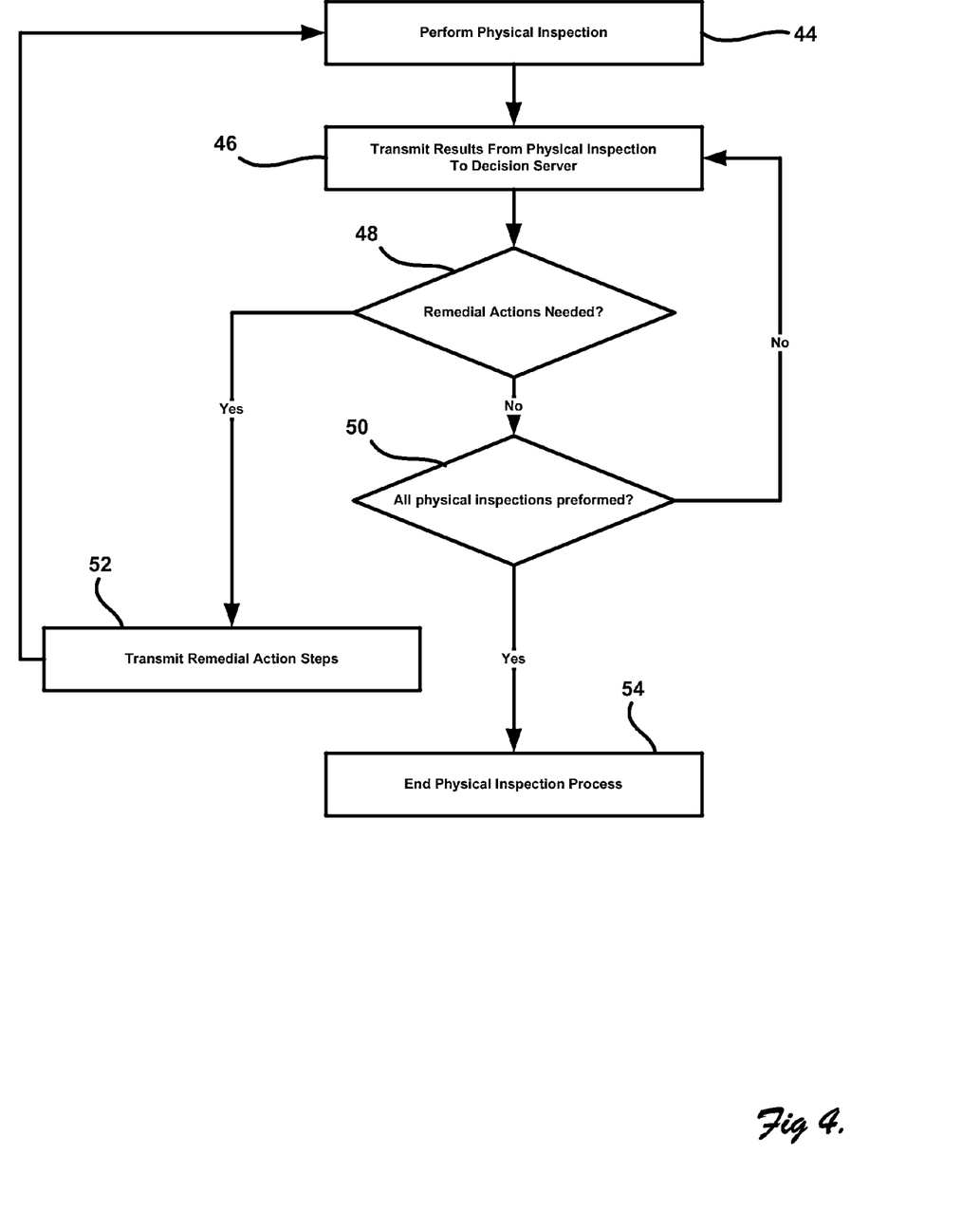

Referring to FIG. 4, the physical inspection of a ground water testing location having a well is described in more detail. At 44, the physical inspection is performed such as checking for a missing or broken lock, whether vegetation on the well pad is overgrown, whether the casing is damaged (causing contamination of well water), or other physical irregularities. The results from the physical inspection are transmitted to the decision server at 46 and a determination is made at 48 whether remediation action is needed. For example, the infield operator would simply replace a lock in case the lock is broken or missing. If the infield operator cannot remedy the problem, the infield operator can request a work order be generated to insure that the lock is eventually repaired. Both remedial action of the lock replacement or work order generation can be accomplished at step 52. If there are no remedial actions needed, a determination is made at 50 whether all the physical inspections are performed. If so, the physical inspection process concludes, otherwise, the process returns to step 46.

Similar to the process described in FIG. 3, performing an inspection on the well purging is handled by similar logic of the computer readable instructions. Purge measurements are taken, transmitted to the decision server and an analysis is performed to determine if remedial action is needed. For example, if the measurements of the purge are taken several times and the one measurement in a series deviates by greater than 10% of the other values, remedial action may be necessary. For example, if the purge measurements require remedial action, the infield operator can be instructed to collect water samples for subsequent analysis.

There are also cases when the remedial action is greatly enhanced by the ability of the invention to provide real-time feedback to the actions taken by the infield operator. For example, if a water sample is measured at the location and the nephelometric turbidity units are greater than 10, the infield operator can be instructed to contact the project manager through the remote computing device. Additionally, the decision server can send an email or text message to the project manager informing the project manager to contact the infield operator to discuss the turbidity reading, especially if metals are to be analyzed, as elevated turbidity in the water sample may lead to erroneous detections of metals.

Another example is when semi-volatile organic compounds are found in the ground water. The infield operator may collect contaminated samples due to improper testing methods. Therefore, the infield operator can be instructed or reminded of proper sampling equipment.

Concerning storm water inspections, the process described in FIG. 3 is also similar. The testing is performed on a containment area which is designed to protect storm water from materials stored in tanks and containers within the containment area. Inspections of containment areas include determining whether the containment area contains water that is unclean. If this is detected, the infield operator can be informed by the decision server to clean the water if possible and if not, to discharge through publicly owned treatment works. The container integrity, if damaged, can be noted for repair by the infield operator or if immediate repairs are not necessary, the infield operator can generate a work order. If there is a truck or trailer involved and it is in need of repair, the infield operator transmits these inspection results to the decision server that can inform the infield operator to repair the truck or trailer or to generate a work order.

When inspections such as that of storm water are made, if data are missing from the inspections schedule, the decision server can include the inspection schedule and determine if there is missing inspection data or information. If so, the decision server can then send an email or other message to the appropriate person to remind them that the inspection is due and to perform the inspection.

Water samples can also be taken and if a sample is missing from the sample collection schedule, the appropriate person can be contacted by the decision server. When notifying the appropriate person (supervisor or infield operator), the decision server can notify the appropriate person on a schedule. For example, if there is a missing inspection or work order date has been exceeded, the decision server can transmit a reminder message to a principal email contact such as the infield operator. If no response to the missed deadline is received by a certain period of time, such as 12 or 24 hours later, the alternate email or contact person can be notified, such as the supervisor or other manager.

Concerning groundwater, there can be a groundwater set of inspection items that include inspection actions for the following: well identification present and legible, lock present and operable, well is freely accessible, concrete pad is intact, protective casing cover is intact, well cap present and intact, inside of security casing is clear of debris and total organic carbon measuring point clearly marked. The well identification is to insure that there well is properly identified and that the identification can be ascertained from the markings or label on the well itself. The well should be locked for safety reasons and this inspection action is concerned with the presence and the functioning of the locking means for the well. The well should be freely accessible allowing for inspection without obstruction. A protective casing cover should be present and intact. The well cap should be present and intact to insure the well is covered. The security casing should be clear of debris. The measuring point for the total amount of organic carbon should be clearly marked so that the measurement should be taken consistently.

Following is a table with the process flow provided by the server computer readable instructions in one embodiment which shows groundwater inspection actions, communications in response to inspection results, remediation action, compliance information and notifications.

TABLE 1

| Inspection Action | Response/Remediation |
|---|---|
| Freely accessible | If yes, done;<br>If no, can access be restored by inspector;<br>If yes, restore and note;<br>If no, send e-mail to client |
| Protective casing cover intact | If yes, done;<br>If no, describe damage and send e-mail to client |
| Concrete pad intact | If yes, done;<br>If no, describe damage and send e-mail to client |
| Well ID present and legible | If yes, done;<br>If no, note what is needed for repair (paint, marker, engraver, new identification plate) and send e-mail to client |
| Lock present and operable | If yes, done;<br>If no, is spare lock available?<br>If yes, replace;<br>If no, send e-mail to client (as part of batch at conclusion of sampling event) |
| Well cap present and intact | If yes, done;<br>If no, describe damage and send e-mail to client |
| TOC measuring point clearly marked | If yes, done;<br>If no, e-mail to client |
| Measure depth to water | Compare to well depth (assume well being measured is 100 feet deep);<br>If measured depth is less than well depth, done;<br>If measured depth is greater than well depth, message to inspector to repeat the measurement;<br>Repeat<br>Compare to average of previous 3 elevation measurements;<br>If greater than +/−5 feet from average, message to inspector to confirm measurement<br>If the well depth measurement is less than the well depth by less than a predetermined amount such as two feet, a message can be sent to the remote computing device to repeat the measurement |
| Clear of debris inside protective casing | If yes, done;<br>If no, describe debris and send e-mail to client |
| Query to inspector - Is the inspection complete? | Check to confirm data are entered for all 10 wells;<br>If yes, respond to inspector that inspection is complete, and send e-mail to client with all noted deficiencies;<br>If no, identify which wells still need to be inspected;<br>Repeat until all wells have data |

The server computer readable instructions can include a set of well identifiers such as MW-001, MW-002, etc. The server computer readable instructions can require that the well identifier comply with a predetermined format rather than have inconsistent entries, such as MW01, MW001, MW-01 and the like. This functionality can also be included in the remote computing device computer readable instructions to insure that the well identifiers are of a consistent format.

In one embodiment, the inspection results can be aggregated and indexed by date and time to identify trends in the inspection results so that activity such as water levels, pollutants, and other items can be seen over time rather than in a snapshot. Such information can be presented in a graphical or textual form.

In the case where the inspection item is the stormwater set, the inspection actions can include: drips or leaks from trucks and trailers, vehicle maintenance activities conducted outside designated areas, vehicle washwaters not directed to a sanitary sewer system, unidentified discharges of pollutants present, indications of additional control measures needed and non-storm water in the storm water detention basin. In the event that these inspection actions are non-compliant, the server computer readable instructions can transmit a notification to the remote computing device as well as to a third party computing device to provide notification that there were non-compliant inspection results. Further, if the event that there are any remediation actions taken on site, the remote computing device can receive input from the infield operator representing the remediation actions taken.

In one embodiment, the environmental conditions, such as the weather conditions, are recorded and associated with the inspection results. This information can be used for developing the trend information and correlate the such inspection results as well depth and rain fall so that the actual measurements can be normalized according to such environmental information.

In the case where the inspection item is the baghouse set, the inspection actions can include: recording differential pressure readings, visible emissions from stack and bag inlet temperature. In one embodiment, if the pressure is less than one PSI or greater than five PSI, the server computer readable instructions transmit a message to the remote computing device to request that the infield operator repeat the measurement. If the second input results is still less than one, the server computer readable instructions transmits a notification to the remote computing device to cease subsequent attempts and transmits the remediation instructions to attempt to repair the filter bag. If the second inspection result is still greater than five, the server computer readable instructions transmits a notification to the remote computing device representing a request to perform maintenance or to replace the bag filter. Further inspection actions are shown below representing one specific embodiment:

TABLE 2

| Measurement/observation | Response/Remediation |
| --- | --- |
| Have data been entered for the week? | If no data Thursday afternoon, e-mail inspector; no data Friday noon, e-mail inspector and supervisor; no data Friday 2:00 pm, e-mail inspector, supervisor, engineering manager [this step may not be particularly useful in the demo, so it can be referenced but not developed] |
| Is the machining process operating for the week? | If yes, continue with inspection. If no, record that the weekly inspection was not needed |
| Record the differential pressure reading (inches water) | If <1.0 or >5.0, message to inspector to confirm the reading; If confirmed, instruct inspector to tell machining operator to shut down and initiate maintenance actions, send e-mail to department supervisor |
| Are emissions visible from the stack? | If yes, instruct inspector to tell machining operator to shut down and initiate maintenance actions, send e-mail to department supervisor |

In the case where the inspection item is the large quantity container set, the inspection actions can include: containers leaking, containers dented, containers corroded, inadequate aisle space, container stacked inappropriately, incompatible wastes are not properly segregated, containers not compatible with washes, containment system include liquids, waste in containment area, cracks present in containment area, containers improperly marked, accumulation date not marked, containers stored for improper periods and containers are not closed. In one embodiment, the server readable instructions, upon receiving an inspection result that is non-compliant, sends a request for information to the remote computing device inquiring whether the reason for non-compliance can be remedied in the field. If not, the server computer readable instructions transmits a notification to a third party that the non-compliance exists.

In one specific embodiment, the inspection actions are shown in the following table:

TABLE 3

| Inspection item | Response/Remediation |
| --- | --- |
| Have data been entered for the week? | If no data Thursday afternoon, e-mail inspector; no data Friday noon, e-mail inspector and supervisor; no data Friday 2:00 pm, e-mail inspector, supervisor, engineering manager [this step may not be particularly useful in the demo, so it can be referenced but not developed] |
| Containers are marked 'Hazardous Waste' | If yes, done; If no, can containers be marked during inspection; If yes, mark containers and comment that the condition is corrected; If no, send e-mail to supervisor |
| Accumulation date is clearly marked | If yes, done; If no, can containers be marked during inspection; If yes, mark containers and comment that the condition is corrected; If no, send e-mail to supervisor |
| Containers stored 90 days or less | Yes, if less than 75 days, done; Yes, if greater than 75 days but less than 90 days, send message to supervisor that pickup needs to be scheduled; If no, immediate e-mail notification to supervisor |
| Containers are closed | If yes, done; If no, can containers be closed during inspection; If yes, close containers and comment that the condition is corrected; If no, send e-mail to supervisor |
| Containers are not leaking | If yes, done; If no, can leaks be stopped during inspection; If yes, abate leak and comment that the condition is corrected; If no, send e-mail to supervisor |
| Containers are not dented or corroded | If yes, done; If no, send e-mail to supervisor |
| Adequate aisle space maintained | If yes, done; If no, send e-mail to supervisor |
| Containers are not stacked more than two high | If yes, done; If no, send e-mail to supervisor |
| Incompatible wastes properly segregated | If yes, done; If no, e-mail to supervisor |
| Containers are compatible with wastes | If yes, done; If no, e-mail to supervisor |
| Containment system does not contain water or other liquids | If yes, done; If no, can liquid be removed during inspection; If yes, remove and comment that the condition is corrected; If no, send e-mail to supervisor |
| There is no waste or debris in the containment area | If yes, done; If no, e-mail to supervisor |
| Containment system does not have cracks or other deficiencies | If yes, done; If no, e-mail to supervisor |

The present invention also allows the inspecting party to obtain inspection results that are not tied to a particular regulatory requirement. This invention can collect inspection results and store these result in the server computer readable medium independent of regulatory inspection protocols. From the stored inspection results, the information needed for the regulatory report can be generated without the inspecting party having to increase the regulatory burden or add inspection information above that required by the appropriate regulation.

Figure 5:
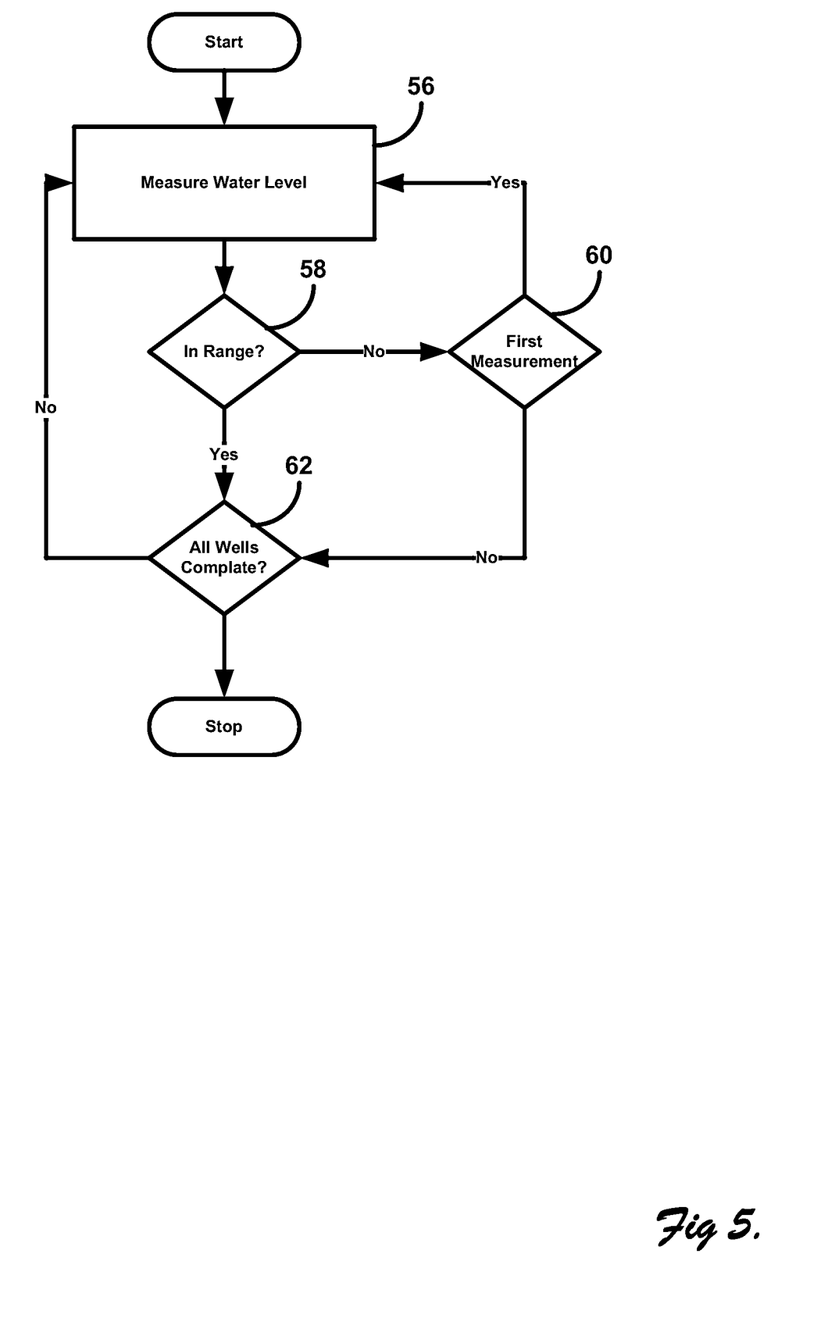

In further describing the invention, FIG. 5 illustrates the server computer readable instructions for groundwater where the measurement is taken at 56. If the inspection results are in range at 58 the determination is made if all wells have been inspected. If so, the process terminates and the inspection result are stored on the server. If the inspection results are not in range, a request to repeat the measurement is transmitted to the remote computing device at 58 if only one measurement has been taken. Otherwise, the invention advances to 62 to determine if all wells are inspected. In one embodiment, the compliance range is provided by the well owner in another embodiment, the range is determined by regulation and in another embodiment the range is determine by industry standards.

Figure 6:
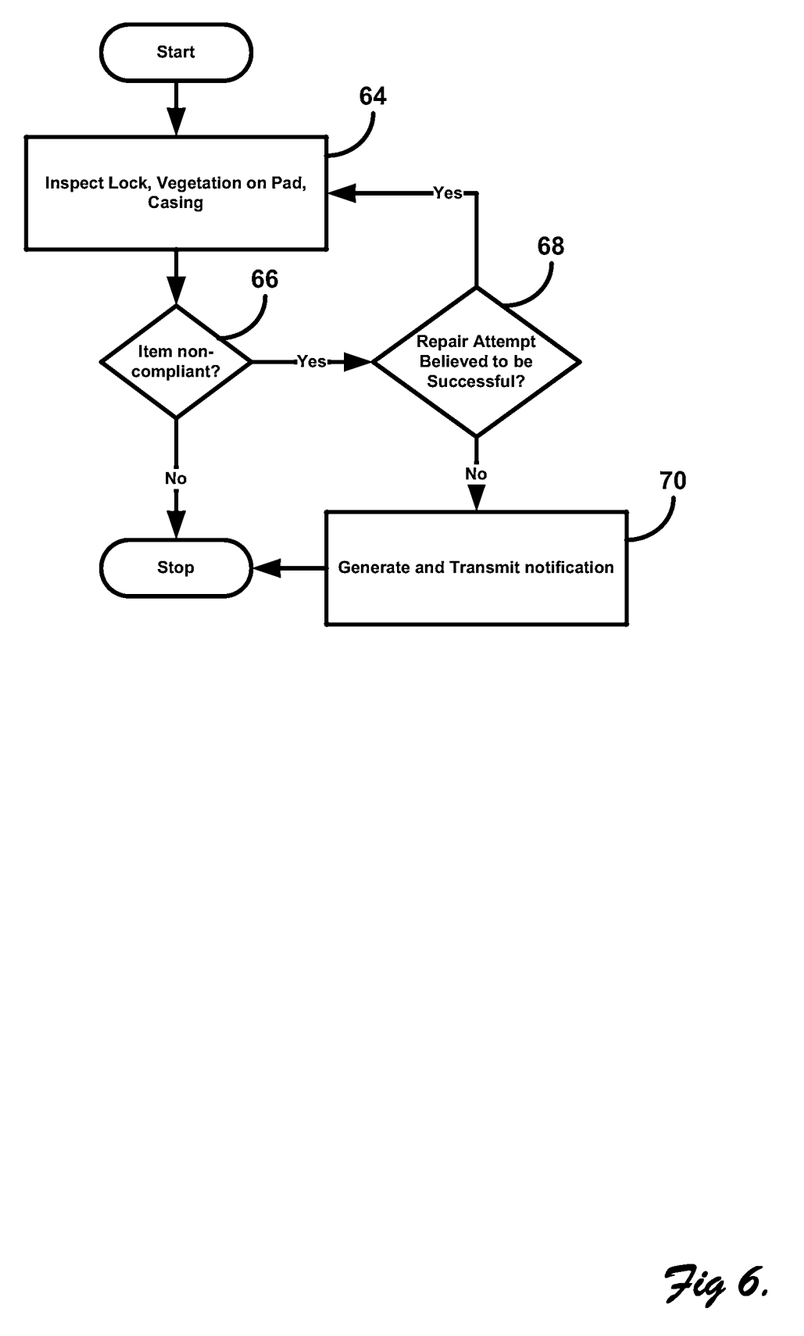

Referring to FIG. 6, in inspection action includes inspecting a well for the lock, vegetation on the pad and the casing at 64. If one of these inspection actions results in the item being non-compliant at 66, the server computer readable instructions transmits a request for the infield operator to attempt to repair the item. If the item is believed to be repaired, the inspection is repeated. If not, a notification is generated and transmitted at 70. In one embodiment, a work order can also be generated and transmitted to the appropriate personal for receiving work orders.

Figure 7:
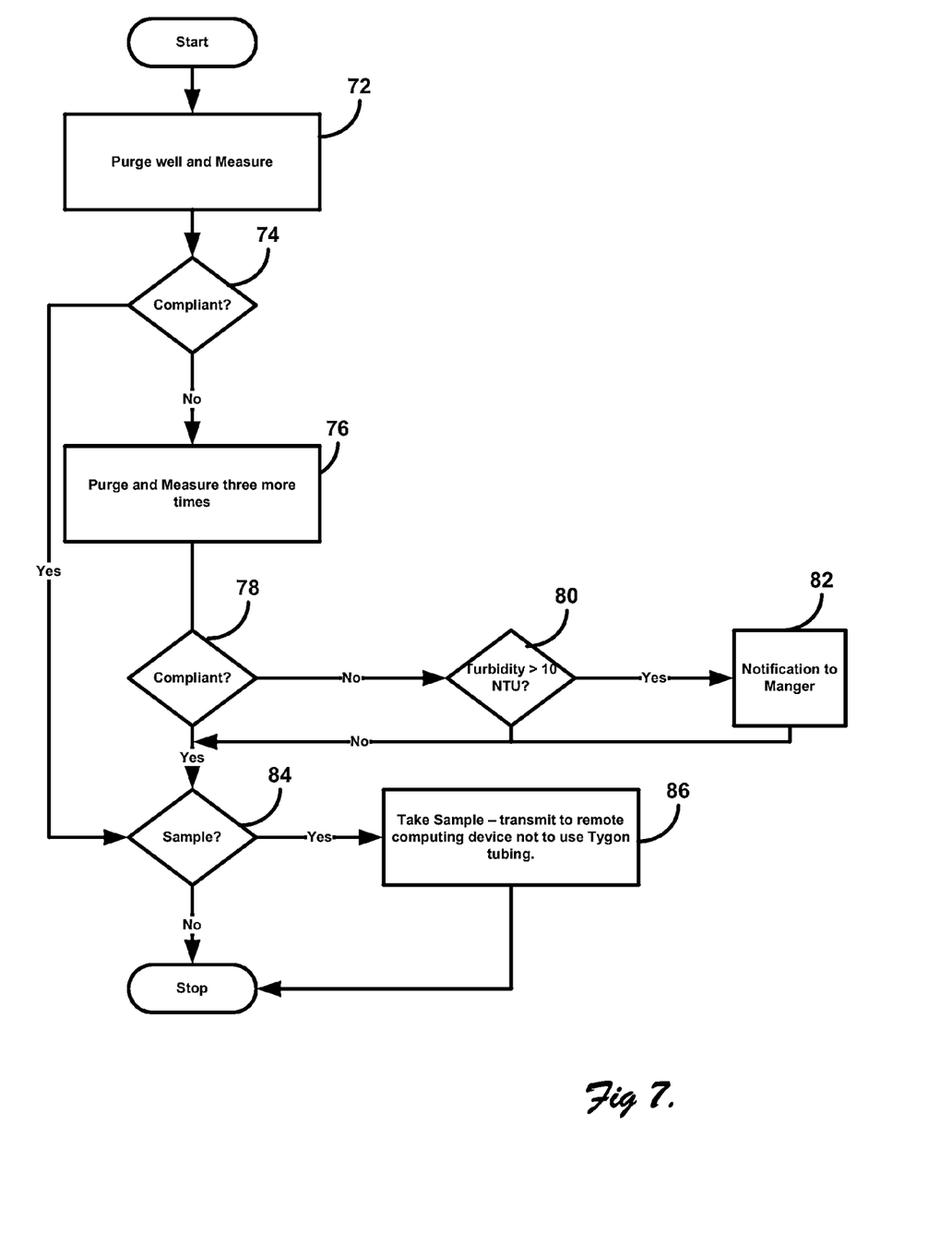

Referring to FIG. 7, remediation action with repeated inspection results is illustrated for ground water monitoring. The initial inspection occurs at 72. If the inspection results are non-compliance (for example the measurement of pH, conductivity, or turbidity is not within ten percent of the complaint values at 74), the server computer readable instructions sends to the remote computing device the inspection protocol that requests that the well be purged and measured three more times at 76. If the subsequent measurements are within ten percent or compliant at 78, a determination if a sample is needed is made at 84 and if so, a sample is taken at 86. The inspection results are stored on the server computer readable medium. The server computer readable instructions can then transmit a notification to the remote computing device to instruct the infield operator to take samples. If the inspection is non-compliant from 78 a determination is made whether the turbidity is greater than a predetermined value at 80. If so, a notification is transmitted to a manager or other third party at 82.

Figure 8:
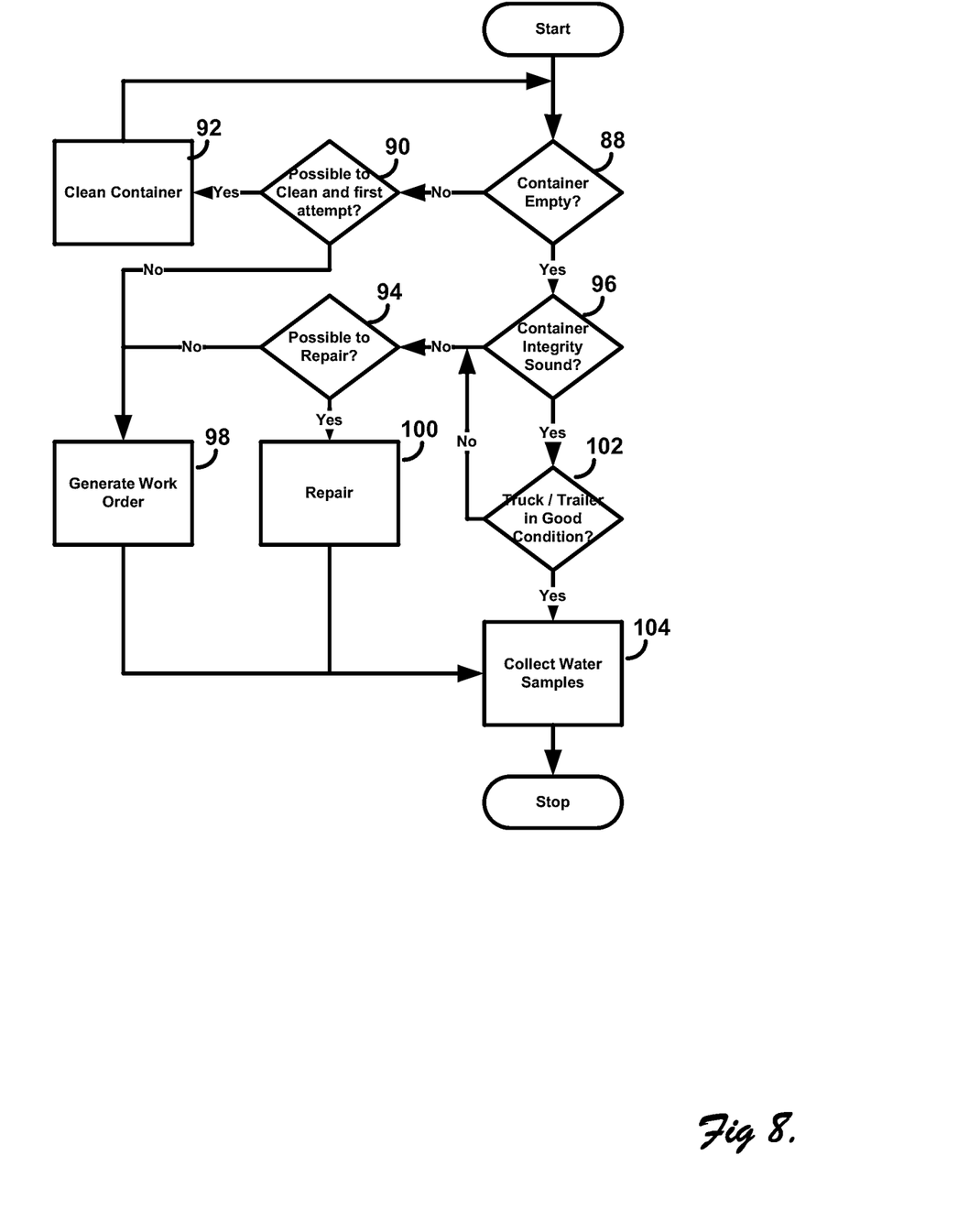
Figure 9:
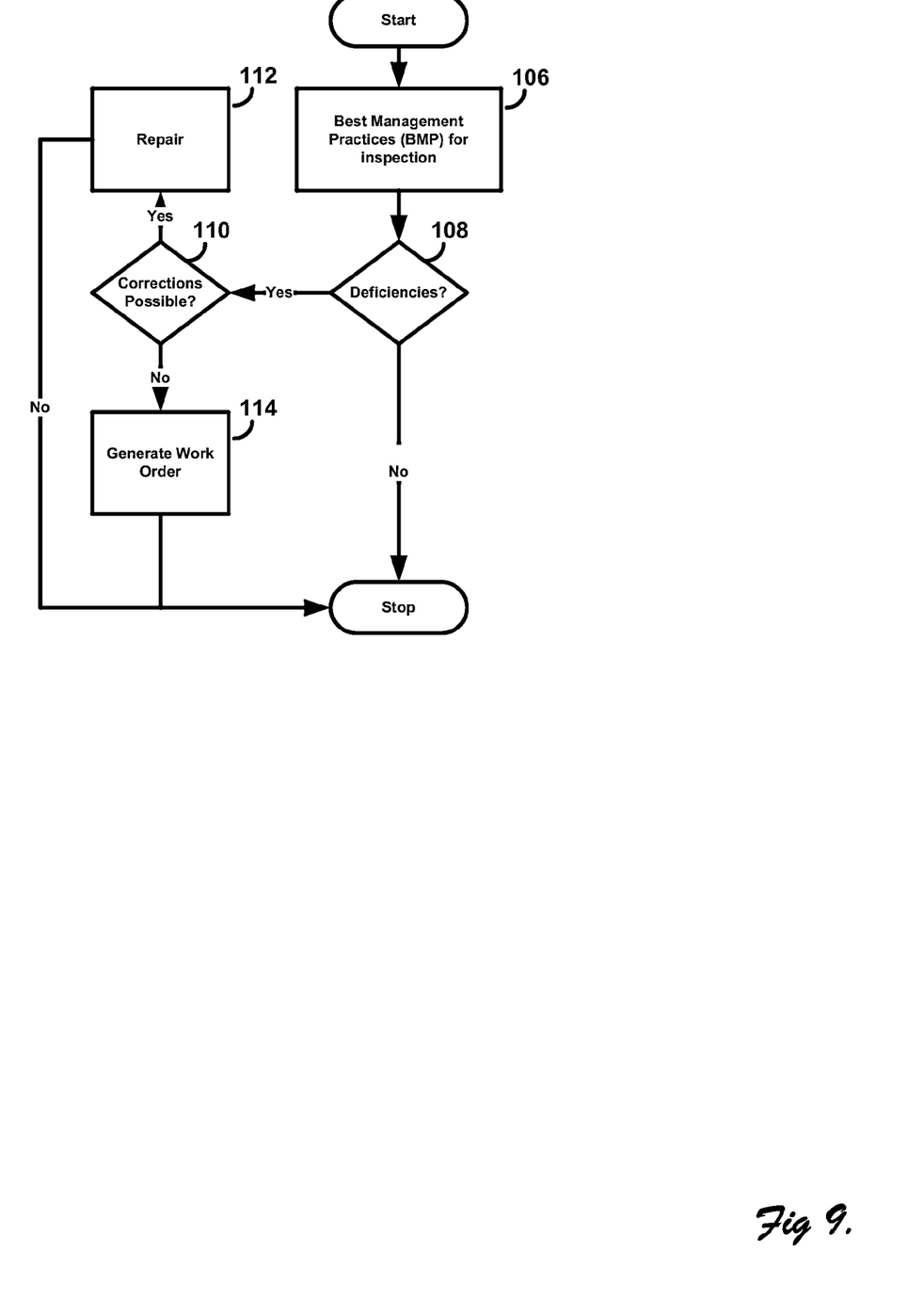

Referring to FIG. 8, remediation action and inspection protocol is shown for stormwater items. For monthly inspections, a determination of the container contents is made at 88. If the container is not empty at 90 the determination is made whether the container can be cleaned at 90. If so, the container is cleaned at 92. The determination whether the container's integrity is sound is made at 96 and if not, the determination is made at 94 whether the container can be repaired. If not, a work order is generated at 98. Otherwise, the container is repaired and the server computer readable instructions move to 104 where a sample of ground water is taken. If the truck or trailer is in good condition at 102, the process moves forward else a determination is made whether the truck or trailer can be repaired at 94.

In one embodiment, groundwater is inspected monthly and if there are no inspection results stored on the computer readable medium by the $25^{th}$ of the month, notification is transmitted to a third party which can include the infield operator. Subsequent notifications can be transmitted on the $28^{th}$, $29^{th}$ and 30th of the month. In one embodiment, as time passes, the number of third parties that receives the notifications increases. For example, the primary contact may receive a notification on the $25^{th}$; the primary and secondary on the $28^{th}$; the primary, secondary and program manager on the 29 and owner of the property on the $30^{th}$. For quarterly inspections, the same can be true for the $60^{th}$, $65^{th}$, $80^{th}$ and $75^{th}$ day of the quarter. In one embodiment, water samples are collected and included in the inspection results.

Referring to FIG. 8, another embodiment for stormwater inspection is shown. In this case, examples are shown for stormwater for construction as opposed to stormwater for existing industrial facilities as described above. The best management practices are inspected at 106. If deficiencies are discovered at 108 a determination is made if they can be corrected at 110. If so, repairs are made at 112. If not a work order is generated at 114. In one embodiment, notifications are generated and transmitted that can be, for example, if there are no inspection results for two days, end of the week (Friday), eight days, nine days, 9½ days, 9¾ days and the like. As the increment between inspection results, the number of third parties that receives notification can increase from the primary contact for the inspection action to a project manager, supervisor and up to the property owner.

While a preferred embodiment of the invention has been described using specific terms, such description is for illustrative purposes only, and it is to be understood that changes and variations may be made without departing from the spirit or scope of the following claims.

What is claimed is:

1. A system for the remediation of non-compliant environmental impact items located at remote locations by an infield operator comprising:
   a server having a server non-transitory computer readable medium and a server processor wherein said server is in electronic communication with a remote computing device;
   a database representing a set of inspection items to be inspected by the infield operator, wherein each inspection item includes an inspection set, wherein each inspection set includes item information, inspection protocol, inspection frequency, remediation action, notification, and compliance information, wherein each inspection item is taken from the group consisting of: groundwater set, stormwater set, baghouse set, and large quantity container set; and,
   server computer readable instructions stored on said server non-transitory computer readable medium that, when executed by said processor, provide for:
      receiving item information representing an inspection item that the infield operator wishes to inspect;
      retrieving said inspection protocol associated with said inspection item that the infield operator wishes to inspect from said database;
      transmitting said retrieved protocol to said remote computing device representing steps to be taken by the infield operator to conduct an inspection of the inspection item that the infield operator wishes to inspect;
      receiving an inspection result from said remote computing device representing a measurement taken for one of said inspection items inspected by the infield operator wherein said inspection result includes a date and time the result was collected, a physical location where the result was collected, and an infield operator identification representing the infield operator conducting the inspection;

retrieving said compliance information associated with said inspection item that the infield operator wishes to inspect from said database;

comparing said retrieved compliance information with said inspection result to determine whether said inspection result is in compliance or non-compliant;

storing said inspection result in said server non-transitory computer readable medium if said inspection result is in compliance;

transmitting a repeat measurement request to said remote computing device if said inspection result is non-compliant thereby requesting that the inspection be repeated;

receiving a second inspection result;

comparing said retrieved compliance information with said second inspection result to determine whether said second inspection result is in compliance or non-compliant;

storing said second inspection result in said server non-transitory computer readable medium if said compliance result is in compliance;

transmitting said remediation action associated with said inspection item that the infield operator wishes to inspect to said remote computing device according to said retrieved inspection protocol if said second inspection result is non-compliant thereby requesting said infield operator to perform the transmitted remediation action;

receiving a remediation action status indicator from said remote computing device wherein said remediation action status indicator is taken from the group consisting of:

remediation action not preformed, remediation action preformed, remediation action taken and non-compliance resolved, and remediation action taken and non-compliance not resolved;

transmitting a second repeat measurement request to said remote computing device if said remediation action status indicator is remediation action taken and non-compliance resolved;

receiving a third inspection result;

comparing said retrieved compliance information with said third inspection result to determine whether said third inspection result is in compliance or non-compliant; and, storing said third inspection result in said server non-transitory computer readable medium if said third inspection result is in compliance.

2. The system of claim 1 wherein said server computer readable instructions include instructions for:

retrieving past inspection results from said server non-transitory computer readable medium for the inspection item that the infield operator wishes to inspect;

determining a time period between a current inspection result and the past inspection results; and, determining whether the current inspection result is within the inspection frequency for the inspection item that the infield operator wishes to inspect.

3. The system of claim 1 wherein said server computer readable instructions include instructions for:

retrieving a date of a most recent inspection result stored in said server non-transitory computer readable medium;

retrieving a current time from said server;

determining a time period of time between the current time and the date of said most recent inspection result; and, determining if said period of time is within the inspection frequency for the inspection item that the infield operator wishes to inspect.

4. The system of claim 3 wherein said server computer readable instructions include instructions for transmitting a warning to said remote computing device if said period of time is outside said inspection frequency for the inspection item that the infield operator wishes to inspect.

5. The system of claim 1 wherein said groundwater set includes inspection actions taken from the group consisting of: well identification present and legible, lock present and operable, well is freely accessible, concrete pad is intact, protective casing cover is intact, well cap present and intact, inside of security casing is clear of debris, and total organic carbon measuring point clearly marked.

6. The system of claim 1 includes:

well information included in said groundwater set representing a plurality of water wells to be tested; and, said server computer readable instructions include instructions for:

determining if inspection results from each water well in said groundwater set are received;

transmitting an exception message to said remote computing device representing water wells for which inspection results were not received; and, requesting said infield operator to inspect said water wells which do not have inspection results.

7. The system of claim 1 includes:

well information included in said groundwater set representing a plurality of water wells to be tested wherein said well information includes well depth;

water depth information included in an inspection result; and, said server computer readable instructions include instructions for:

comparing said water depth information with said well depth;

retrieving a prior well depth measurement; and, transmitting an error to said remote computing device if said well depth is within a predetermined range of said prior well depth measurement.

8. The system of claim 1 wherein said stormwater set includes inspection actions taken from the group consisting of: drips or leaks from trucks and trailers, vehicle maintenance activities conducted outside designated areas, vehicle washwaters not directed to a sanitary sewer system, unidentified discharges of pollutants present, indications of additional control measures needed, and non-storm water in the storm water detention basin.

9. The system of claim 1 wherein said baghouse set includes inspection actions taken from the group consisting of: recording differential pressure readings, visible emissions from stack, and filter bag inlet temperature.

10. The system of claim 1 wherein said large quantity container set includes inspection actions taken from the group consisting of: containers leaking, containers dented, containers corroded, adequate aisle space, containers stacked appropriately, incompatible wastes are properly segregated, containers compatible with washes, containment system devoid of liquids, no waste in containment area, cracks not present in containment area, containers properly marked, accumulation date marked, containers stored proper period, and containers closed.

11. The system of claim 1 wherein said server computer readable instructions include instructions for:
   generating a warning message when an inspection item is deemed non-compliant; and,
   transmitting said inspection item to a second individual to provide notification of a non-compliant inspection item.

12. The system of claim 1 wherein said server computer readable instructions include instructions for:
   generating a work order when an inspection item is deemed non-compliant; and,
   transmitting said work order to a recipient designated to receive work orders for said inspection item.

13. The system of claim 1 wherein said server computer readable instructions include instructions for generating a compliance report.

14. The system of claim 13 wherein said server computer readable instructions include instructions for generating a regulatory compliance report.

\* \* \* \* \*